United States Patent [19]
Little et al.

[11] Patent Number: 6,078,605
[45] Date of Patent: Jun. 20, 2000

[54] TRACK-CHANGING UTILIZING PHASE RESPONSE OF RESONATORS

[75] Inventors: Brent E. Little, Boston, Mass.; Sai Tak Chu, Kawasaki, Japan; Hermann A. Haus, Lexington, Mass.

[73] Assignee: Massachusetts Institute of Technology, Cambridge, Mass.

[21] Appl. No.: 09/027,383

[22] Filed: Feb. 20, 1998

[51] Int. Cl.$^7$ .............................. H01S 3/083; H01S 3/03; G02F 6/26; G02F 1/35; G02B 6/24

[52] U.S. Cl. ................................. 372/94; 372/94; 372/32; 372/92; 372/28; 372/6; 372/108; 372/100; 385/15; 385/50; 359/326; 359/222; 359/211; 455/610; 437/129; 437/130; 437/133; 350/356

[58] Field of Search ................................. 372/94, 32, 92, 372/28, 6, 100, 66, 108; 385/15, 50; 359/326, 222, 211; 455/610; 213/328; 350/356; 437/129, 130, 133

[56] References Cited

U.S. PATENT DOCUMENTS

| | | | |
|---|---|---|---|
| 4,630,885 | 12/1986 | Haavisto | 385/30 |
| 4,720,160 | 1/1988 | Hicks, Jr. | 385/31 |
| 4,998,255 | 3/1991 | Gerstenberger et al. | 372/28 |
| 5,004,342 | 4/1991 | Bernard et al. | 356/350 |
| 5,158,908 | 10/1992 | Blonder et al. | 438/32 |
| 5,227,911 | 7/1993 | Schiller et al. | 359/222 |
| 5,446,573 | 8/1995 | Lomashevitch et al. | 359/158 |
| 5,572,542 | 11/1996 | Dixon | 372/92 |
| 5,790,583 | 8/1998 | Ho | 372/92 |
| 5,825,799 | 10/1998 | Ho et al. | 372/92 |
| 5,878,070 | 3/1999 | Ho et al. | 372/92 |

FOREIGN PATENT DOCUMENTS

98/53535  11/1998  WIPO .

OTHER PUBLICATIONS

Yosi Shani, "Integrated Optic Adiabatic Device on Silicon" IEEE J. Quantum Electronics, vol. 27, pp. 556–566.

B. E. Little, "Microring resonator channel dropping filters", IEEE J. Lightwave Tech., vol. 15, pp. 998–1005.

Primary Examiner—Robert H. Kim
Assistant Examiner—Delma R. Flores Ruiz
Attorney, Agent, or Firm—Samuels, Gauthier & Stevens, LLP

[57] ABSTRACT

A device and method of track changing an optical signal beam in response to the frequency selective phase characteristics of a resonator. The resonator is side-coupled to a single optical beam and only affects that beam's phase, without disturbing its amplitude to any significant degree. For all resonator and input beam configurations, the phase-shift at a resonant frequency is always π, thus the relative switching characteristics are similar regardless of the exact configuration. Track changing is accomplished through interferometry. The signal, after having interacted with the resonator, is made to interfere with a reference beam. The reference beam is created by dividing an input signal into two paths, one which interacts with the resonator, the other which serves as the reference. In an alternative embodiment, the device acts as a mode converter. The resonator converts an even system-mode to an odd system-mode (or vise versa). At the output of the device is an interference filter, or mode filter, which redirects the signal according to the phase response of the resonator.

32 Claims, 5 Drawing Sheets

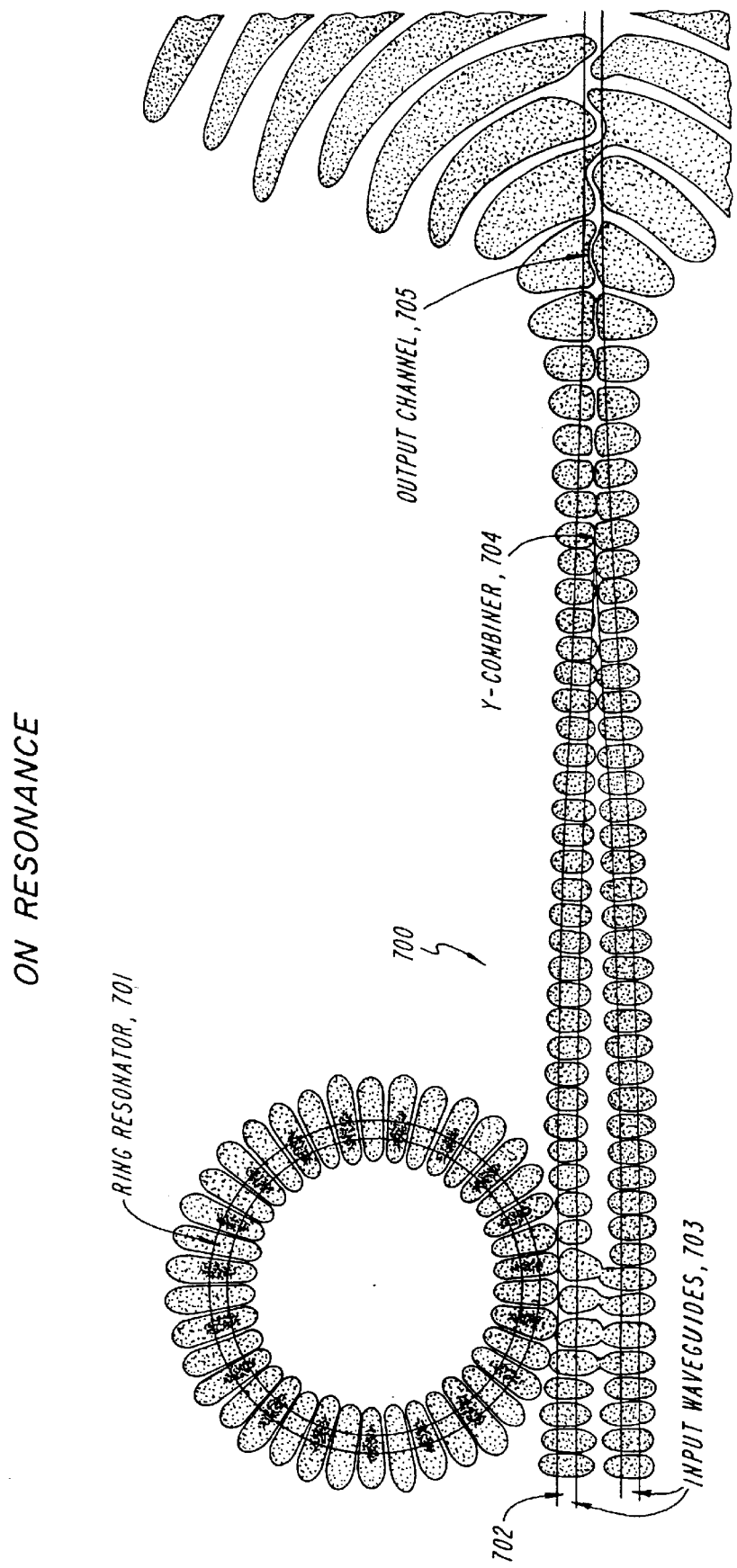

TRACK-CHANGING UTILIZING PHASE RESPONSE OF RESONATORS

SPONSORSHIP INFORMATION

This invention was made with government support under Grant No. F49620-96-1-0126 awarded by the U.S. Air Force. The government has certain rights in the invention.

BACKGROUND OF THE INVENTION

The invention relates to systems and methods of track changing an optical signal beam in response to the frequency selective phase characteristics of a resonator.

In electromagnetic devices, from radio frequencies of several kilohertz to optical frequencies of several hundred terahertz, resonators are one of the most widely used components. A resonator is a cavity which stores electromagnetic energy by recirculating the power in a closed loop. The energy that a specific resonator stores is highly frequency selective. Resonators are ideally suited to signal processing applications because of this selectivity. By combining numerous resonators appropriately, virtually any signal processing function can be synthesized. Thus, resonators are versatile building blocks.

For optical frequency applications, resonators are fabricated from dielectric cavities. The cavities may have a variety of geometries, such as a disk, a ring, or a straight section of waveguide with reflectors on each end. Ideally, a resonator would be part of an optical integrated circuit (OIC). As such, it would be fabricated on a dielectric substrate by conventional lithographic and etching techniques. A simple yet practical application of an integrated resonator device is shown in FIG. 1.

FIG. 1 is a schematic of a conventional optical track changing device 100 employing a side-coupled resonant cavity. The device 100 consists of a micro-ring resonator 101 side coupled to two optical first 102 and second 103 waveguides, and serves as an optical channel dropping filter. At a specific resonant wavelength, a signal applied at an input port 104 of the first waveguide 102 can be completely diverted to an output or drop port 105 of the second waveguide 103. At other wavelengths, the signal bypasses the ring and exits at a throughput port 106 of the first waveguide.

Such devices have recently been demonstrated as described by Foresi et al., CLE097 conference, paper CPD-22, Baltimore Md., May 1997. Although the devices have not yet reached a practical level of perfection, it is expected that refinements in fabrication will eventually yield useful devices. In general, however, very high quality integrated devices will continue to be a challenge, since the dimensions involved require precision on the order of nanometers or less. These dimensions might be unobtainable with standard processing techniques designed for integrated optics.

On the other hand, discrete resonators (rather than integrated) with qualities approaching the theoretical limit of perfection are now available. These resonators are in the form of micro-particles and micro-spheres, which are relatively inexpensive, and readily available. Micro-spheres, for example, can be fabricated from molten glass, which upon cooling, forms a nearly flawless globe due to surface tension. A quantitative measure of a device's quality is its Q value. The Q value is related to how much energy a device can store. Etched integrated micro-resonators of the sort shown in FIG. 1 have achieved Qs of up to several thousand.

Micro-spheres on the other hand have been reported with Qs of over $10^9$. Refer to Gorodetsky et al., "Ultimate Q of optical micro-sphere resonators", Optics Letters, vol. 21, P. 453–455, 1996. Micro-particles have other advantages over integrated resonators. While in a molten state, dopant material may be added to the particle which enhances certain effects. Also, the power circulating in a high Q resonator can build up to extremely high intensities, which is useful in observing nonlinear and quantum effects. Further, micro-particles are discrete, and may be replaced if damaged or if not of the proper dimensions. Several practical devices have been proposed for micro-particle resonators such as filters, switches, micro-spectrometers, and for measuring ultra-small displacements.

To date however, the realization of useful devices utilizing discrete resonators have been restricted by the conventional method of deploying them, which is depicted in FIG. 2. FIG. 2 is a schematic of the conventional method of deploying micro-particle resonators as devices. As shown, a micro-particle 201 is typically placed in proximity to a waveguide or freely transmitted optical beam 202. Light from the adjacent input beam 202 is coupled, as at 203, into the micro-particle where it circulates if the input wavelength is matched to a resonant mode of the particle. Power circulating in the resonator either couples back out into an output beam direction 204 or is evanescently lost to scattering, as at 205, out of the particle or to absorption by intrinsic effects. To observe the greatest effect of the resonant particle on the input beam in the scenario of FIG. 2, all the power on the input beam has to be scattered out of the particle or be absorbed.

The conventional deployment of resonators shown in FIG. 2 is extremely restrictive for a number of reasons. First, in order to scatter all of the input beam power, the interaction between the input beam and the particular resonant mode within the particle has to be precisely controlled. Physically, this means that the placement of the particle with respect to the input beam is critical. Also, different resonant modes of the particle which occur at different frequencies require different optimum placements. Therefore, the device cannot be efficient at all wavelengths. Second, the scattered light might be collected by a photodetector, however, scattering typically occurs in all directions of space, making power collection complicated and inefficient. Third, it is usually desirable to have a device that responds as a so called track changing configuration. That is, an input signal is diverted to a different (but well defined) path or waveguide by the response of the resonator. A track changing device is depicted in FIG. 1, where at resonance the power is completely diverted to the output waveguide.

It is not well appreciated that the micro-particle has a well defined phase response, which except for a scaling factor, is independent of the resonator shape, or its coupling configuration to an external beam. By appropriately using the phase response of a micro-particle, so called ideal track changing response can be achieved. This means that all the advantages of the device in FIG. 1 can be realized without resorting to two waveguides simultaneously coupled to the resonator.

SUMMARY OF THE INVENTION

The invention provides a means of track changing an optical signal beam in response to the frequency selective phase characteristics of a resonator. The resonator is side-coupled to a single optical beam and only affects that beam's phase, without disturbing its amplitude to any significant degree. For all resonator and input beam configurations, the phase-shift at a resonant frequency is always π, thus the relative switching characteristics are similar regardless of the exact configuration. Track changing is accomplished through interferometry. The signal, after having interacted with the resonator, is made to interfere with a reference beam. The reference beam is created by dividing an input signal into two paths, one which interacts with the resonator, the other which serves as the reference. In an alternative embodiment, the device acts as a mode converter. The resonator converts an even system-mode to an odd system-mode (or vise versa). At the output of the device is an interference filter, or mode filter, which redirects the signal according to the phase response of the resonator.

An optical resonator is a cavity which stores optical energy. Various resonator configurations are possible, and a particularly advantageous one is a micro-sphere cavity. Micro-spheres have optical qualities approaching theoretical limits of perfection, can be doped with different materials to enhance certain effects, and are relatively inexpensive.

Accordingly, the invention provides a method of processing an optical signal comprising providing an optical signal with a selected amplitude; and coupling the optical signal to a resonator to produce a phase response on the optical signal at a resonant frequency.

In another embodiment, the invention provides a resonator system comprising a resonator; and means for coupling an optical beam to the resonator to produce a phase response on the amplitude of the optical beam at a resonant frequency.

BRIEF DESCRIPTION OF THE DRAWINGS

FIG. 7B is a plot of a field distribution in an exemplary track changing device at a resonant wavelength.

DETAILED DESCRIPTION OF THE ILLUSTRATED EMBODIMENTS

Figure 1:
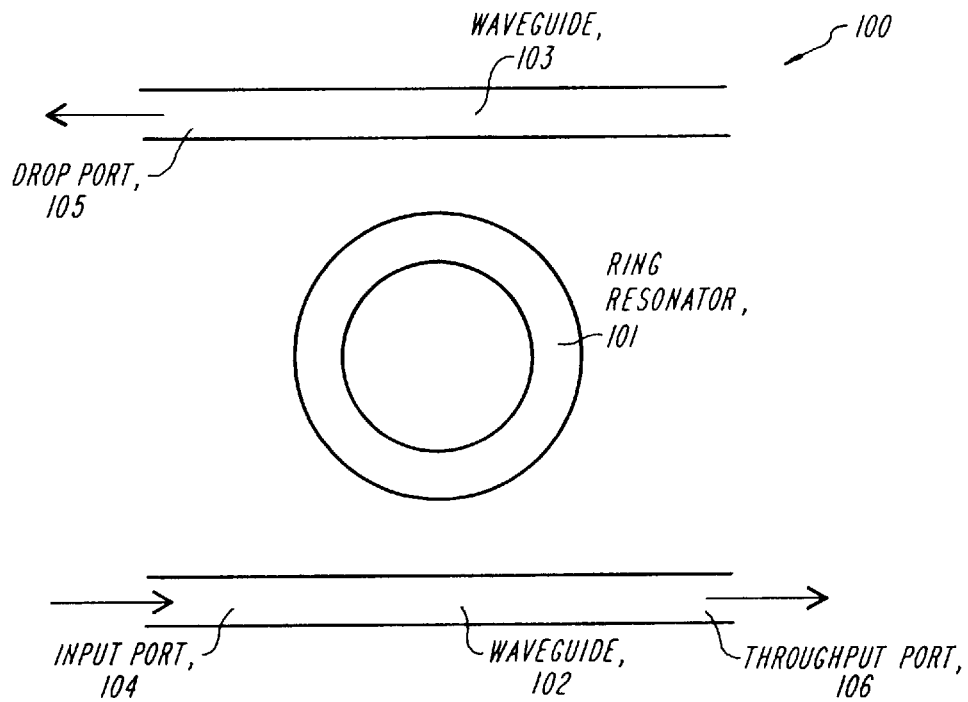
FIG. 1 is a schematic of a conventional optical track changing device employing side-coupled resonant cavity.
Figure 2:
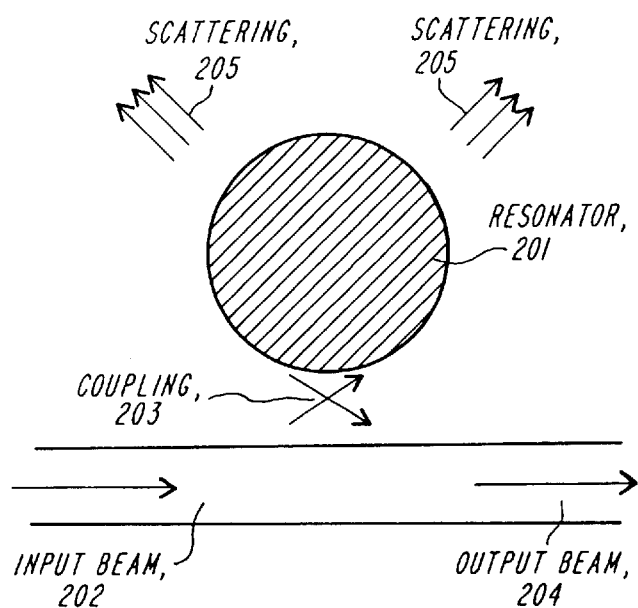
FIG. 2 is a schematic of the conventional method of deploying micro-particle resonators as devices.
Figure 3:
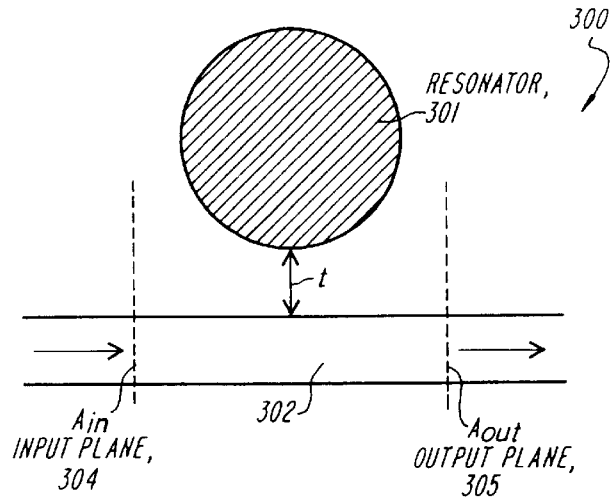
FIG. 3 is a schematic of a device with a discrete particle resonator side-coupled to an input beam or waveguide.

FIG. 3 is a schematic of a device 300 including a discrete particle resonator 301 which is side-coupled to an optical beam 302 or associated waveguide. The optical beam can be in free space, or be guided by a dielectric waveguide. The edge of the particle sits a distance t away from the edge of the optical beam or waveguide. This distance determines the coupling strength between one of the resonant modes within the particle and the mode of the optical beam.

A wave travelling towards the particle has an input amplitude of $A_{in}$ at input plane 304, and while after having interacted with the particle, acquires an amplitude $A_{out}$ at output plane 305. $A_{in}$ and $A_{out}$ are the amplitudes at some arbitrary reference planes before and after the particle, as shown by the dashed lines. The response of the particle is defined as $A_{out}/A_{in}=T_p(\Delta\omega)$, where $T_p$ is the particle transfer function, and $\Delta\omega$ is the shift in the optical frequency $\omega$, away from the frequency $\omega_o$, $\Delta\omega=\omega-\omega_o$. The transfer function is:

$$A = \left[\frac{\Delta\omega^2 + (1/T_l - 1/T_i)^2}{\Delta\omega^2 + (1/T_l + 1/T_i)^2}\right] \quad (2)$$

$$\theta = \pi - \arctan\left[\frac{\Delta\omega T_i T_l}{T_l - T_i}\right] - \arctan\left[\frac{\Delta\omega T_i T_l}{T_l + T_i}\right] \quad (3)$$

$A(\Delta\omega)$ is the amplitude response, while $\theta(\Delta\omega)$ is the phase response. $T_i$ is related to the interaction strength between the particle and input beam, while $T_1$ is related to the intrinsic losses of the particle such as scattering and absorption. See for example, B. E. Little et al. "Microring resonator channel dropping filters", IEEE J. Lightwave Tech., vol. 15, pp. 998–1005, 1997, incorporated herein by reference.

The relations in equations (1–3) reveal a few key attributes of the resonator configuration. In the conventional deployment of resonators, it is desired that all the input power be scattered at resonance, or in the case of equation (1), A→0 when $\Delta\omega$=0. This only occurs under the special case of $T_1=T_i$, which means that the coupling configuration must be carefully chosen to match the resonators intrinsic losses. When the intrinsic loss is negligible ($T_1>>T_i$), the amplitude response is unity. In other words, no power is lost at the output. This will be the most practical and common case, since the micro-particles of interest are those that have extremely low losses. On-resonance when $\Delta\omega$=0, the phase shift is always $\pi$, regardless of the details of the structure, or coupling configuration, (which are manifest through $T_i$ and $T_1$). Far from resonance when $\Delta\omega T_i>>1$, the phase shift approaches 0(or $2\pi$). In the practical cases of $T_1>>T_i$, the relative shape of the response in terms of $\Delta\omega$ is always the same and is simply scaled by the factor $T_i$.

In order to construct a practical device, the amplitude of the input wave must be manipulated, rather than only its phase. Typically, it is desirable that the input optical signal be diverted to a new, but well defined, direction by the response of the device. This is called channel dropping or track changing. Such a device gives the largest possible change in amplitude, and the greatest noise immunity.

Figure 4:
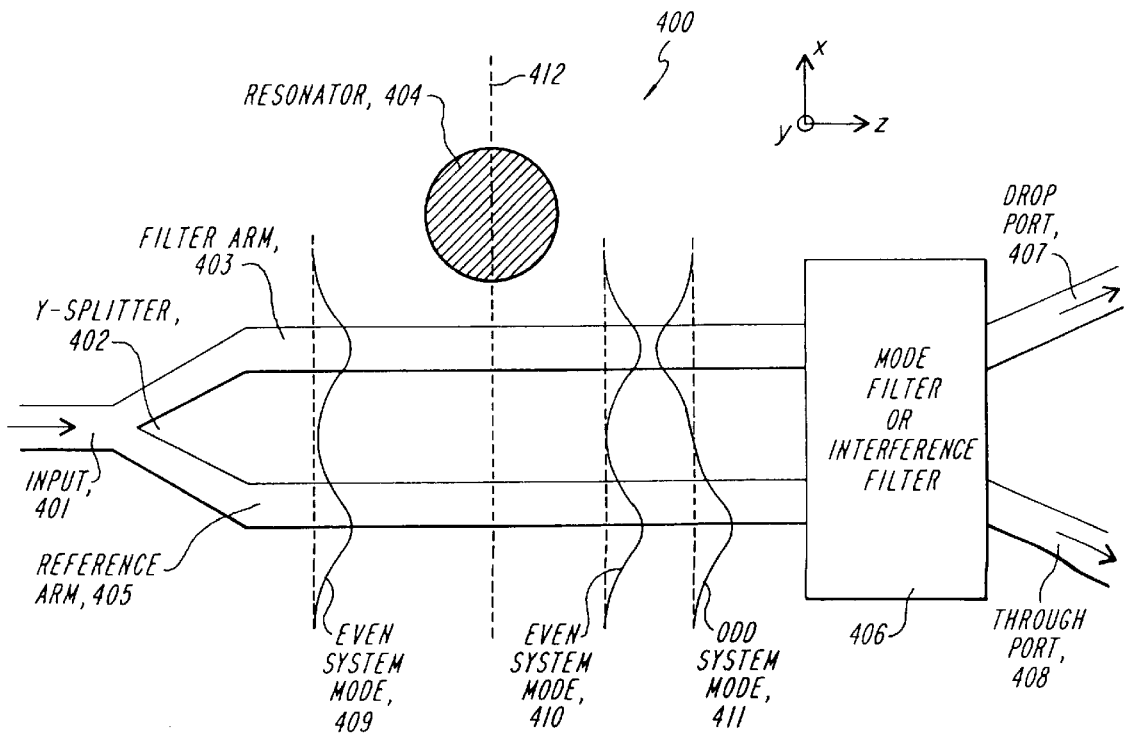
FIG. 4 is a schematic of an exemplary optical track changing device using the phase response of a resonator coupled to a single waveguide, and incorporating a mode or interference filter.

The phase response of the resonator can be converted to an amplitude response by using interferometry. Interferometry involves mixing the output of the resonator with a reference beam. A particularly simple and practical arrangement is depicted in FIG. 4. FIG. 4 is a schematic of an exemplary optical track changing device 400 using the phase response of a resonator coupled to a single waveguide, and incorporating a mode or interference filter. A single input beam or waveguide 401 is equally split into two arms by an integrated optics Y-splitter 402 or beam splitter.

The two arms are spaced far enough apart so that they do not mutually interact. One branch, called the filter arm 403, interacts with a resonator 404 and acquires a phase response. The other branch, called the reference arm 405, is left isolated. At the output, the two branches are recombined in an output combiner device 406 such as an interference filter or a mode filter. The actual output combiner will depend on how the signal is to be manipulated. Provisions can be made on the filter or reference arm to tune the optical phase or amplitude, for example, by electro-optic or thermo-optic means, in order to fine tune the response and compensate for any fabrication deviations.

In FIG. 4, the action of the mode filter is to divert the signal in to a drop port 407 when the change of the phase in the filter arm is π, (i.e. resonance), or to send it to a throughput port 408 at all other off-resonant values.

The foregoing description is based on the concept of interferometry. Another useful yet equivalent interpretation of the track changing device is that of a mode converter. In FIG. 4, the system modes are depicted before and after interacting with the particle. The system modes are defined as the modes of the entire system consisting of both the filter and reference arms. The input Y-splitter 402 creates an even-mode 409, where the amplitudes are equal in each arm. The two-waveguide structure can in fact support two-system modes. The other mode is the referred to as an odd-mode, where the amplitude in one arm is positive while the other is in negative.

Off-resonance, the resonator does not affect the system modes, and thus the output consists only in the unperturbed even-mode 410. On-resonance, the sign of the upper branch amplitude is reversed due to the π-phase shift response. The field amplitude in the filter branch is now negative with respect to the reference branch. This field pattern however, represents the odd-system mode 411. Thus, the resonator acts as a mode converter. At the output, a filter is placed which can distinguish between the even mode and the odd mode, directing the optical power accordingly. The mode-conversion interpretation just described, and the interference interpretation highlighted before that, are equivalent descriptions of the same device.

Figure 5A:
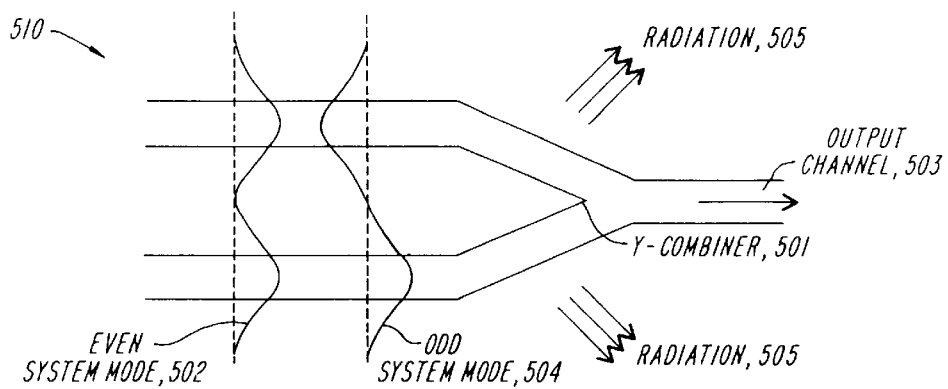
FIGS. 5A and 5B are schematics of typical mode filters, FIG. 5A being a Y-combining mode filter which collects only the even system mode and scatters the odd system mode, and FIG. 5B being an even/odd mode splitter.
Figure 5B:
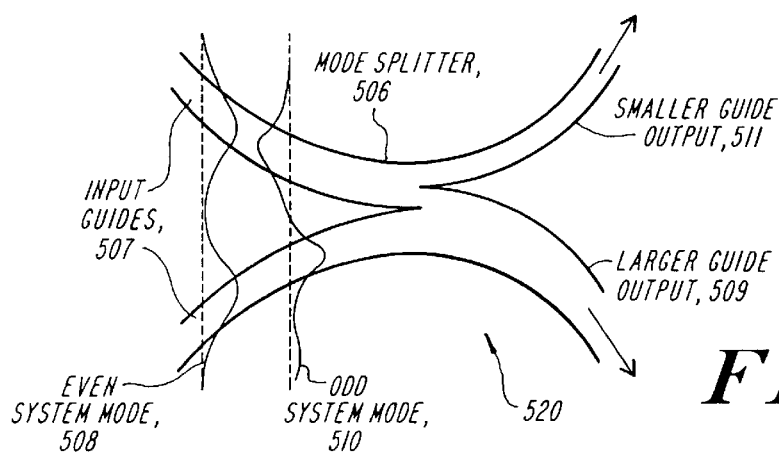

Two simple mode converting (or alternatively, interference) filters are shown in FIGS. 5A and 5B. FIGS. 5A and 5B are schematics of mode filters, FIG. 5A illustrating a Y-combining mode filter 510 which collects only the even system mode and scatters the odd system mode, and FIG. 5B illustrating an even/odd mode splitter 520. In free space, a beam splitter may be used.

In FIG. 5A, the filter 510 includes a Y-combiner 501, identical in form to the input Y-splitter 402 in FIG. 4. The filter works by combining the even-mode 502 into a single output channel 503. On the other hand, the odd-mode 504 is coupled to the radiation modes, or is scattered as at 505.

In FIG. 5B, the filter 520 includes an even/odd mode splitter 506. The two input waveguides 507 can be arbitrary. At the output, one waveguide is either much smaller, or much larger than the other. An even-mode 508 at the input of the mode filter follows the largest waveguide 509 at the output, while an odd-mode 510 follows the smaller of the two output guides 511. See for example, Shani et al., "Integrated optic adiabatic devices on silicon", IEEE J. Quantum Electronics, Vol. 27, pp. 556–566, 1991, incorporated herein by reference.

Figure 6:
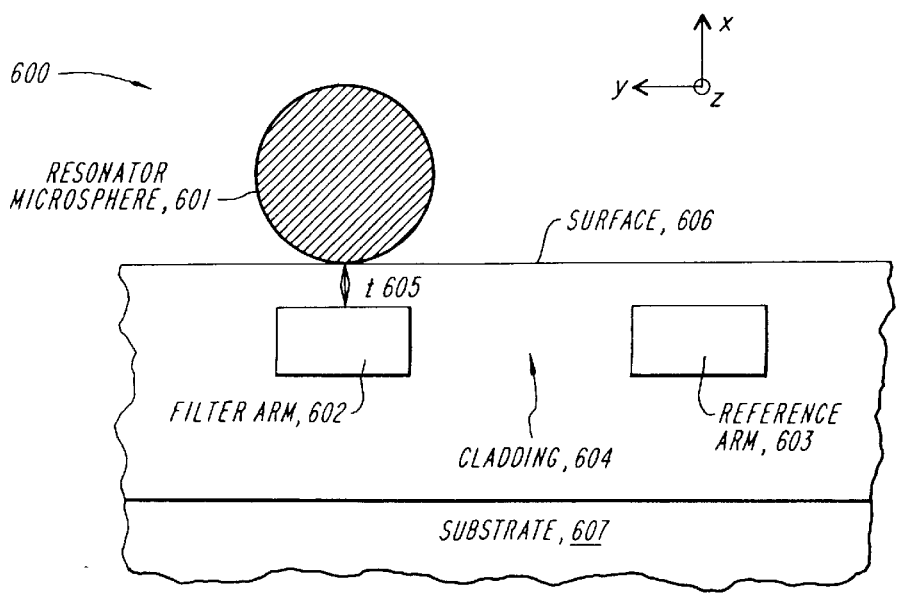
FIG. 6 is a cross sectional view of a schematic block diagram of an exemplary track changing discrete resonator device utilizing micro-spheres with integrated waveguides.

FIG. 6 is a cross sectional view of a schematic block diagram of a track changing discrete resonator device 600, using high quality micro-spheres 601, and integrated waveguides including filter arm 602 and reference arm 603. For illustration purposes, the cross section can be equated to that view along the center line 412 of FIG. 4. The two channel waveguides 601,603 are embedded in a cladding 604 situated on a substrate 607. The channel waveguides lie a distance t below the top surface 606 of the device 600. A micro-particle or micro-sphere 601 is positioned above the filter arm 602. The micro-particle may also be suspended some distance above the surface, for example, by mechanical means.

Figure 7A:
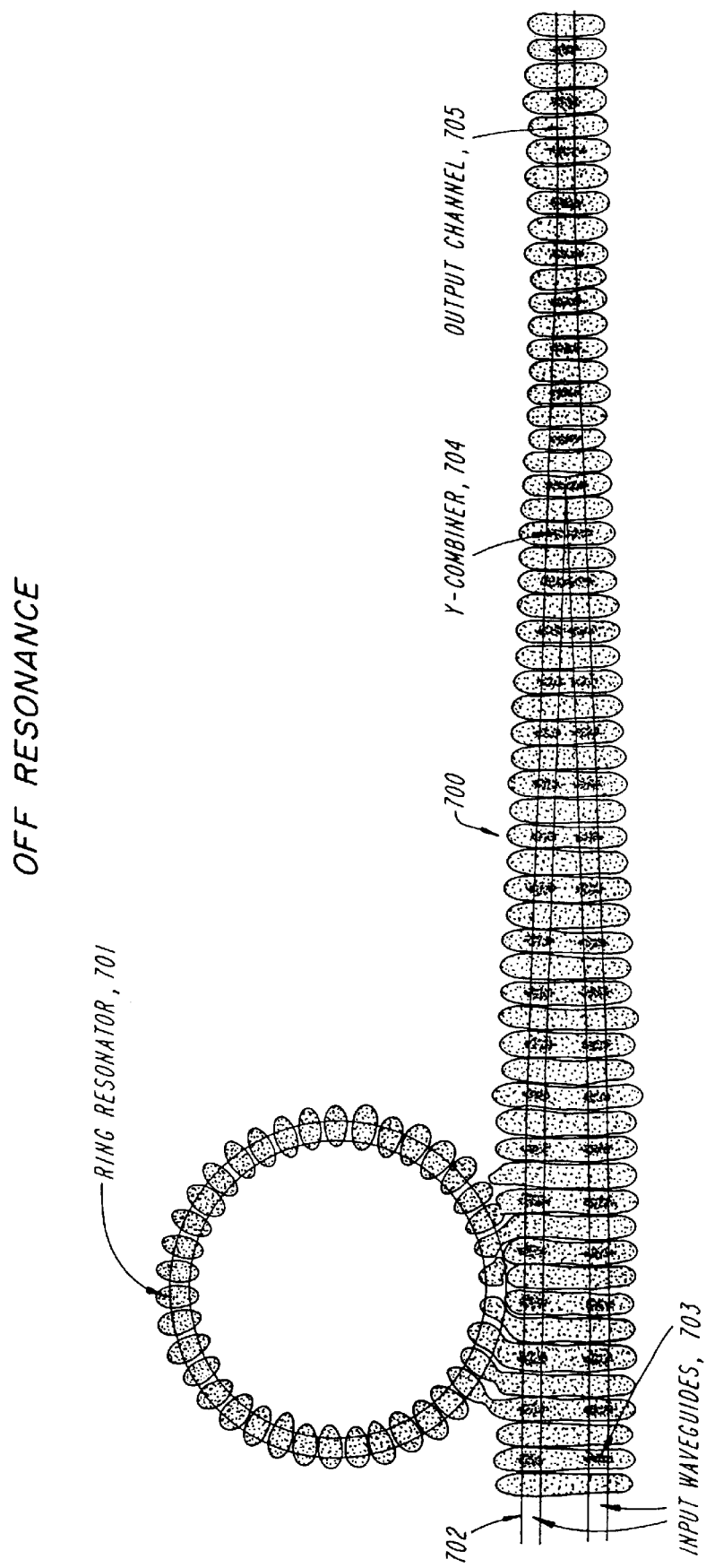
FIG. 7A is a plot of a field distribution in an exemplary track changing device of the invention at an off resonant wavelength.

The results of a rigorous numerical simulation of the proposed device is demonstrated in FIGS. 7A and 7B, and corresponds with the device configuration of FIG. 4. FIG. 7A is a plot of a field distribution in an exemplary track changing device of the invention at an off resonant wavelength. FIG. 7B is a plot of a field distribution in an exemplary track changing device at a resonant wavelength.

The device 700 includes a resonator, and in the illustrated case a ring-resonator 701. The simulated device consists of two identical input waveguides 702,703, in which both are excited with equal amplitudes (i.e. the simulation input is the even system mode, note even-mode 409 of FIG. 4). The mode filter at the output of the device is a Y-combiner 704, which is described with reference to FIG. 5A.

FIG. 7A shows the response off-resonance where the even mode is unaffected by the ring-particle, and is recombined by the Y-combiner. FIG. 7B shows the on-resonance response, where the ring converts the even-mode to the odd-mode, which is subsequently scattered at the Y-combiner.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A method of processing an optical signal comprising:
   providing an optical signal with a selected amplitude; and
   coupling said optical signal to a resonator to produce a phase response on said optical signal at a resonant frequency.

2. The method of claim 1, wherein said resonator comprises a micro-sphere resonator.

3. The method of claim 1, wherein said resonator comprises a micro-ring resonator.

4. The method of claim 1, wherein said phase response comprises a phase shift of said optical signal.

5. The method of claim 4, wherein said phase shift comprises a phase shift approaching π at said resonant frequency.

6. The method of claim 4, wherein said phase shift comprises a phase shift approaching 0 at off-resonant frequencies.

7. The method of claim 1, wherein said optical signal is transmitted in a waveguide.

8. The method of claim 1, wherein said optical signal is transmitted in free space.

9. The method of claim 1 further comprising interacting said optical signal with a reference signal.

10. The method of claim 1 further comprising implementing an amplitude response in response to said phase response.

11. A resonator system comprising:
    a resonator; and
    means for coupling an optical beam to said resonator to produce a phase response on the amplitude of said optical beam at a resonant frequency.

12. The system of claim 11, wherein said resonator comprises a micro-sphere resonator.

13. The system of claim 11, wherein said resonator comprises a micro-ring resonator.

14. The system of claim 11, wherein said phase response comprises a phase shift of said optical signal.

15. The system of claim 14, wherein said phase shift comprises a phase shift approaching π at said resonant frequency.

16. The system of claim 14, wherein said phase shift comprises a phase shift approaching 0 at off-resonant frequencies.

17. The system of claim 11, wherein said optical beam is transmitted in a waveguide.

18. The system of claim 11, wherein said optical beam is transmitted in free space.

19. The system of claim 11 further comprising means for interacting said optical signal with a reference signal.

20. The system of claim 11 further comprising means for implementing an amplitude response in response to said phase response.

21. A method of processing an optical signal comprising:

providing an optical signal with a selected amplitude;

splitting said optical signal into equivalent first and second signals;

coupling said first signal to a resonator to produce a phase and amplitude response in said first signal at a resonant frequency; and recombining said first and second signals.

22. The method of claim 21 further comprising transmitting even-modes of said optical signal at off-resonant frequencies to a first output channel.

23. The method of claim 22 further comprising coupling odd-modes of said optical signal at said resonant frequency to radiation modes.

24. The method of claim 22 further comprising coupling odd-modes of said optical signal at said resonant frequency to a second output channel which is smaller than said first output channel.

25. The method of claim 21 further comprising recombining said first and second signals in a mode filter.

26. The method of claim 21 further comprising recombining said first and second signals in an interference filter.

27. A system for processing an optical signal comprising:

a splitter adapted to split said optical signal into equivalent first and second signals;

a resonator;

means for coupling said first signal to said resonator to produce a phase and amplitude response in said first signal at a resonant frequency;

a recombiner adapted to recombine said first and second signals.

28. The system of claim 27 further comprising a first output channel adapted to transmit even-modes of said optical signal at off-resonant frequencies.

29. The system of claim 28, wherein odd-modes of said optical signal at said resonant frequency are scattered.

30. The system of claim 28 further comprising a second output channel adapted to transmit odd-modes of said optical signal at said resonant frequency, said second output channel being smaller than said first output channel.

31. The system of claim 27, wherein said recombiner comprises a mode filter.

32. The system of claim 27, wherein said recombiner comprises an interference filter.

* * * * *